(12) United States Patent
Ungvari

(10) Patent No.: US 6,276,707 B1
(45) Date of Patent: Aug. 21, 2001

(54) HEIGHT-ADJUSTING DEVICE FOR KICKSTANDS

(76) Inventor: Joseph Leslie Ungvari, 1600 Vista Creek Dr., Roseville, CA (US) 95661

( * ) Notice: Subject to any disclaimer, the term of this patent is extended or adjusted under 35 U.S.C. 154(b) by 0 days.

(21) Appl. No.: 09/444,439

(22) Filed: Nov. 22, 1999

(51) Int. Cl.$^7$ ................................................ B62H 1/00
(52) U.S. Cl. ............................ 280/293; 280/297; 280/301
(58) Field of Search ............................ 280/293, 297, 280/298, 299, 300, 301, 302, 303, 304; 248/188.1, 188.2, 188.6, 188.7, 354.1, 354.3, 354.6, 354.7

(56) References Cited

U.S. PATENT DOCUMENTS

| 4,223,906 | 9/1980 | Gratza . | |
|---|---|---|---|
| 4,417,746 | 11/1983 | Baron . | |
| 4,637,624 | 1/1987 | Shur . | |
| 4,681,299 | * 7/1987 | Sieberj | ................................ 254/8 R |
| 4,817,977 | 4/1989 | Bookbinder . | |
| 4,986,557 | 1/1991 | Muszynski . | |
| 5,067,739 | 11/1991 | Kuan . | |
| 5,388,848 | 2/1995 | Silva et al. . | |
| 6,170,846 | * 1/2001 | Holter | ................................ 280/293 |

* cited by examiner

Primary Examiner—Christopher P. Schwartz
Assistant Examiner—C. T. Bartz

(57) ABSTRACT

A device which automatically adjusts a kickstand's point of contact with the ground to insure that the vehicle is always resting at the optimal angle of lean when parked, irregardless of the contour of the surface of the ground. The device is designed to be installed between the frame of the motorcycle and the existing kickstand, and can therefore be installed when a motorcycle is being assembled, or on motorcycles already in use. It is also designed to be minimally visible in order to preserve the aesthetic qualities of a motorcycle.

4 Claims, 6 Drawing Sheets

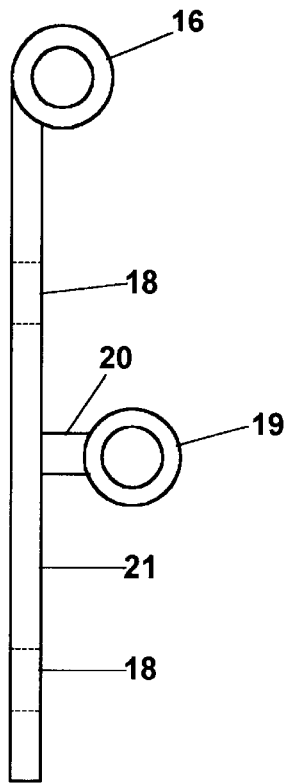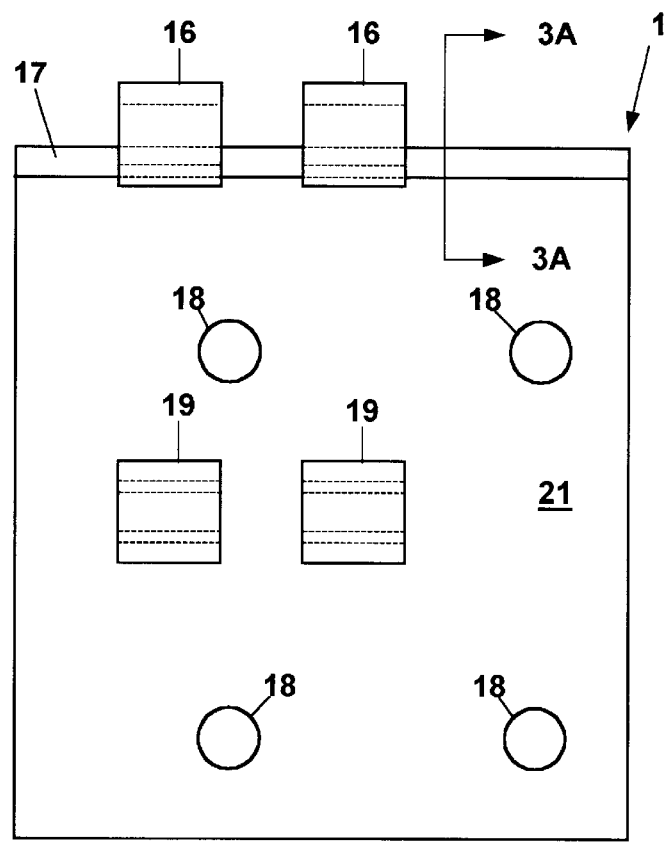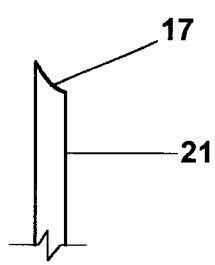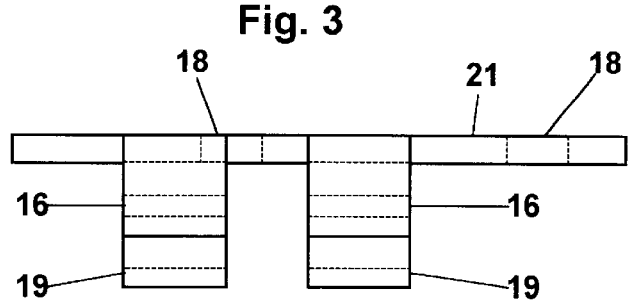
Fig. 4
Fig. 3
Fig. 3A
Fig. 5

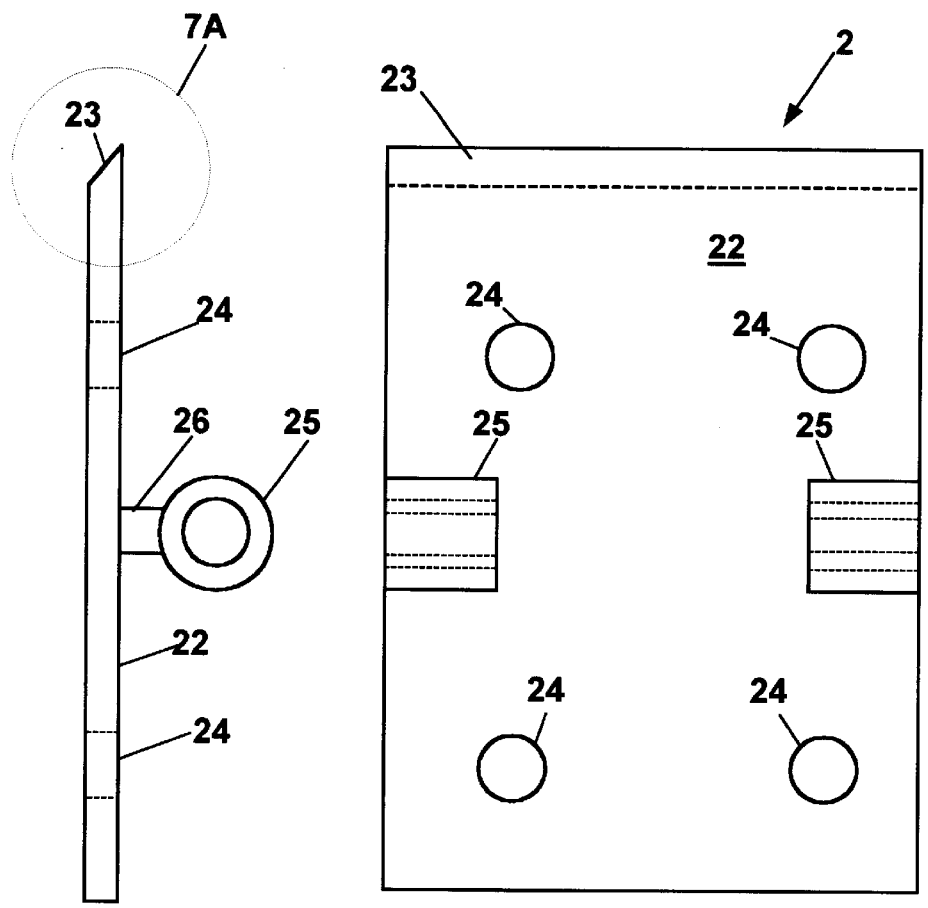
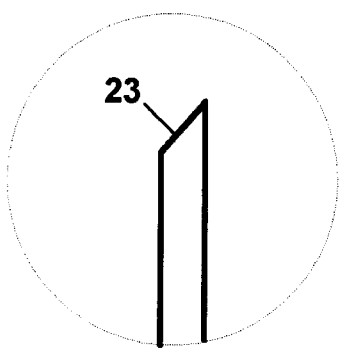
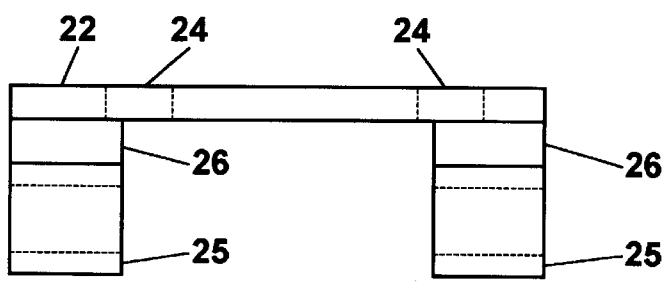
Fig. 7
Fig. 6
Fig. 7A
Fig. 8

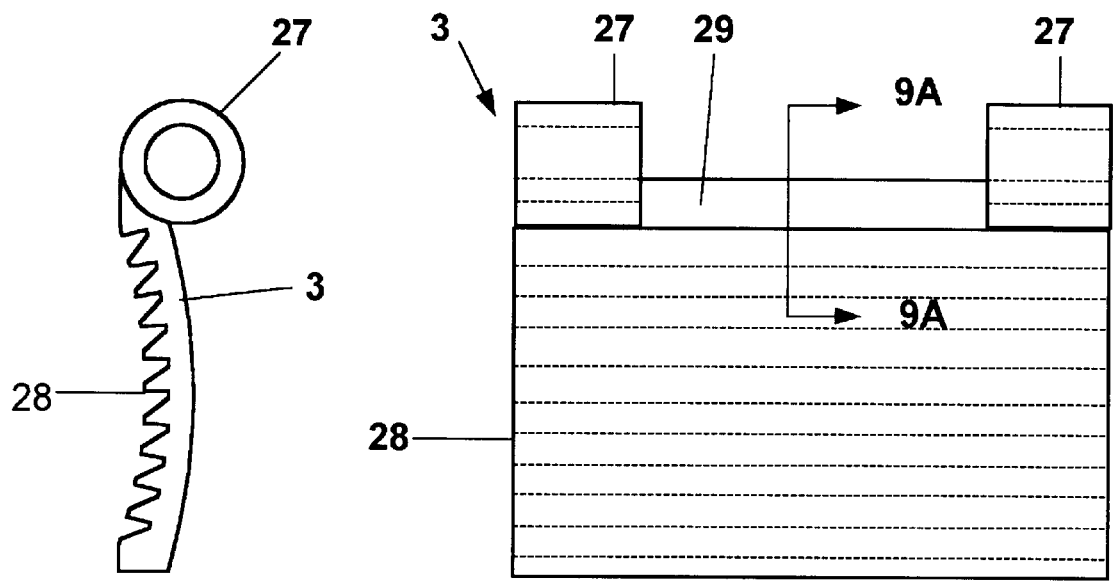
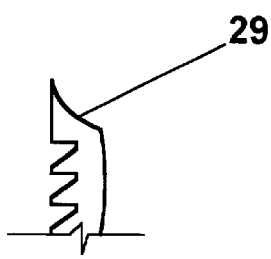
Fig. 10
Fig. 9
Fig. 9A

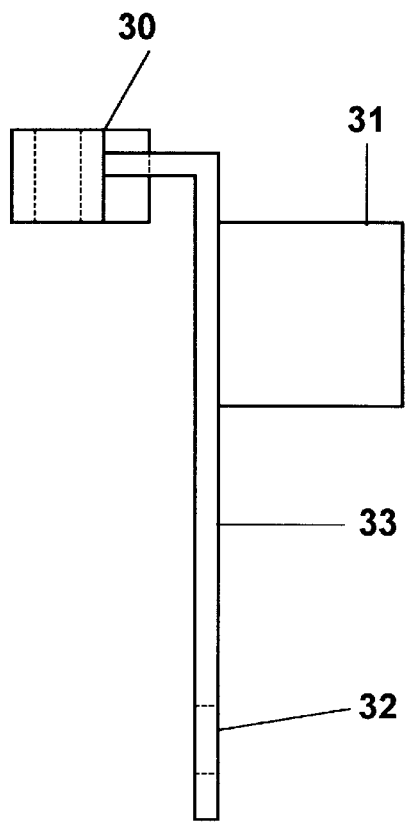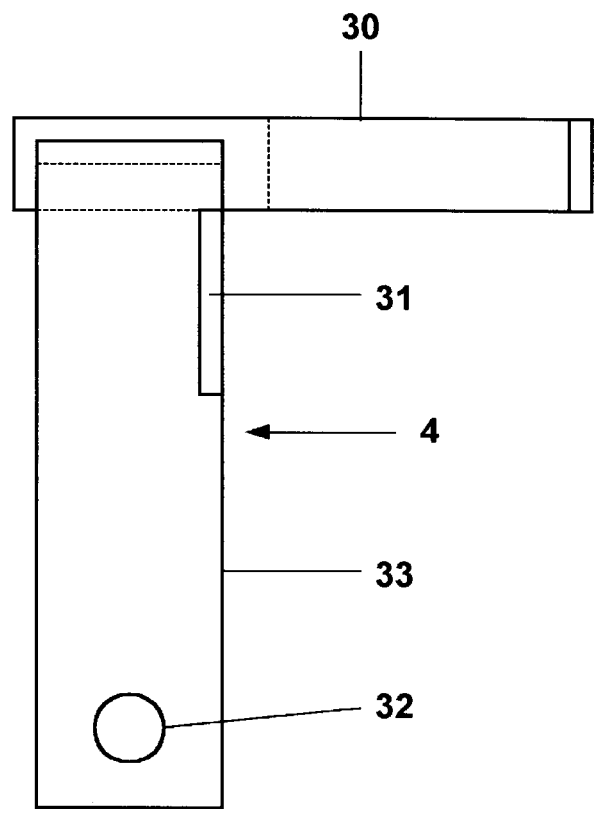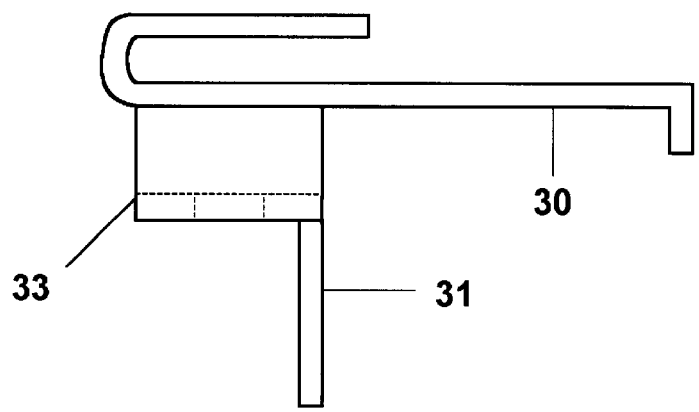
Fig. 12
Fig. 11
Fig. 13

HEIGHT-ADJUSTING DEVICE FOR KICKSTANDS

BACKGROUND

1. Field of Invention

The field of invention relates to support devices for motorcycles or bicycles, commonly referred to as kickstands and, more particularly devices used in combination with or as part of a typical kickstand device to support the motorcycle at a tilted angle.

2. Description of Prior Art

When two-wheeled vehicles, such as motorcycles or bicycles are parked, they are generally positioned in either an upright or leaning orientation. Generally, a kickstand of some sort is attached to the vehicle and, when the vehicle is about to be parked, the kickstand is swung downward to make contact with the ground for support. The kickstand is generally designed to lock in a particular position relative to the vehicle and, if the ground that the kickstand rests on is reasonably level, the vehicle's orientation is at an optimal angle and the vehicle is reasonably stable. If the ground that the kickstand rests on is not level, the vehicle's orientation is less than optimal, and the stability of the parked vehicle suffers correspondingly.

For kickstands that are designed to uphold a parked vehicle at a tilted angle, achieving and maintaining the motorcycle at the optimal angle of lean is critically important. Parking at the optimal angle of lean is essential in preventing a two-wheeled vehicle from falling over and sustaining damage, in minimizing the risk of injuries to the rider or others standing near the parked vehicle, and in limiting the amount of weight that must be lifted by the rider to bring the vehicle to an upright position in preparation for riding. In view of the above, it would be desirable if a device were available which lowered or raised the kickstand's point of contact with the ground, to compensate for uneven ground surfaces, whenever the vehicle was parked. By so adjusting the kickstand, the device would insure that the vehicle was always parked at the optimal angle of lean, irregardless of the contour of the surface of the ground.

This invention is also designed to minimize the impact on the motorcycle's aesthetic appearance. Many of today's motorcycle enthusiasts are very cognizant of the physical appearance of their machines. As an example, enthusiast that ride Harley Davidson motorcycles frequently install expensive components for the sole purpose of enhancing the aesthetic value of their motorcycle. These components are frequently chromed and designed to have a pleasing visual impact. This device is designed with these considerations in mind. The device installs between the frame of the motorcycle and the existing kickstand. It can be chromed and is minimally visible because of its size and position on the motorcycle. It can therefore be installed at the factory when a motorcycle is being assembled, or on motorcycles already in use. Moreover, by virtue of the fact that the device can be sold with or without its own kickstand, costs of producing the device can be minimized and the aesthetic value of the existing kickstand can also be preserved.

Throughout the years, a number of innovations have been developed relating to kickstands for two-wheeled vehicles, and the following U.S. patents are representative of some of those innovations: U.S. Pat. Nos. 5,388,848; 4,986,557; 4,817,977; 4,223,906; 4,417,746; 4,637,624; and 5,067,739. Some of these patents include structures that adjust the length of the kickstand(s) to better conform to the ground surface, and thereby maintain the proper orientation for maximum stability. One such device is described in U.S. Pat. No. 5,388,848, to Leroy F. Silva and Darwayne Fischer. This device is designed to maintain a two-wheeled vehicle in an upright position. To employ the device, the rider must first lower the first leg and lean the vehicle on that leg. Then the rider must lower the second leg, and rock the vehicle on both legs to get it into the proper position. Although this multi-stepped process presumably achieves the desired result, a device that accomplishes the same type of result when the kickstand is simply swung out, would be more desirable.

Another such device is described in U.S. Pat. No. 4,986,557, to Richard S. Muszynski. This motorcycle stand is designed such that it must somehow be attached to the frame of a motorcycle and presumably replaces the existing kickstand. It holds the vehicle in an upright position by means of a spring loaded, sliding support rod with a large circular pad mounted on a universal joint arrangement. This device does not appear to be designed for motorcycles that have low clearances from the ground (4 to 5 inches), such as those mentioned above and is not designed for motorcycles designed to be parked at a tilted angle. It also does not appear to be capable of maintaining a large heavy motorcycle weighing six to eight hundred pounds in a stable position. Even if this device could be adapted for use on heavy low motorcycles, it would significantly effect the aesthetic appearance of the motorcycle it was installed on.

Other such devices are described in U.S. Pat. No. 4,417,746, to Baron Gunter, and U.S. Pat. No. 5,067,739, to Chung A. Kuan. Gunter's device is not designed to adjust the kickstand to compensate for an other-than-level surface. Its primary feature is that it safely swings back into the storage position if the rider forgets to swing the kickstand prior to starting.

Kuan's device is a two kickstand arrangement designed to hold the motorcycle in an upright position. It is a relatively complex device with a transmission gear set and rotating bevel gears which drive cylindrical extendable supports. Since motorcycles are, by their nature, driven in the weather, the reliability of this complex a device may be questionable. Also, it does not appear to be designed for motorcycles with very low clearances, or motorcycles designed to be parked in a tilted position and finally, this device would significantly impact the aesthetic appearance of the motorcycle.

Similarly, U.S. Pat. Nos. 4,637,624, to Don Shur, and U.S. Pat. No. 4,817,977, to David Bookbinder do not fulfill the same objectives as the device in this application. Both of these devices are designed to assist the rider in lifting the motorcycle to an upright position in preparation for riding.

OBJECTIVES AND ADVANTAGES

Thus, while the foregoing body of prior art indicates it to be well known to use kickstands to maintain a two-wheeled vehicle in the proper orientation on a support surface, the prior art described above does not teach or suggest a two-wheeled vehicle support apparatus which has the following combination of desirable features: (1) adjusting the kickstand to compensate for uneven ground surfaces, thereby maintaining the two wheeled vehicle at the optimum lean angle for maximum stability while parked; (2) designed for easy installation between the motorcycle and an existing or included kickstand; (3) requires no additional effort by the rider to employ; (4) is a simple design with only three moving parts, to maximize reliability and minimize maintenance; (5) is designed such that its potential impact on the aesthetic appearance of motorcycle is minimal; and (6) can be manufactured to fit numerous models by simply conforming the hole pattern to the particular model. The foregoing desired characteristics are provided by the unique height adjusting apparatus of the present invention as will be made apparent from the following description. Other advantages of the present invention over the prior art will also be rendered evident.

DESCRIPTION OF THE DRAWINGS

The following description of the drawings will assist in better understanding the invention. The descriptions below makes reference to the drawings annexed herein:

FIGS. 3, 4 and 5 show the front, side and top views respectively of the frame plate. FIG. 3A shows the frame plate bevel.

FIGS. 6, 7 and 8 show the front, side and top views respectively of the backing plate. FIG. 7A shows the backing plate bevel.

FIGS. 9 and 10 show the top and side views respectively of the ratchet plate. FIG. 9A shows the ratchet plate bevel.

FIGS. 11, 12 and 13 show the front, side and top views respectively of the lifting arm.

REFERENCE NUMERALS IN DRAWING

Figure 1:
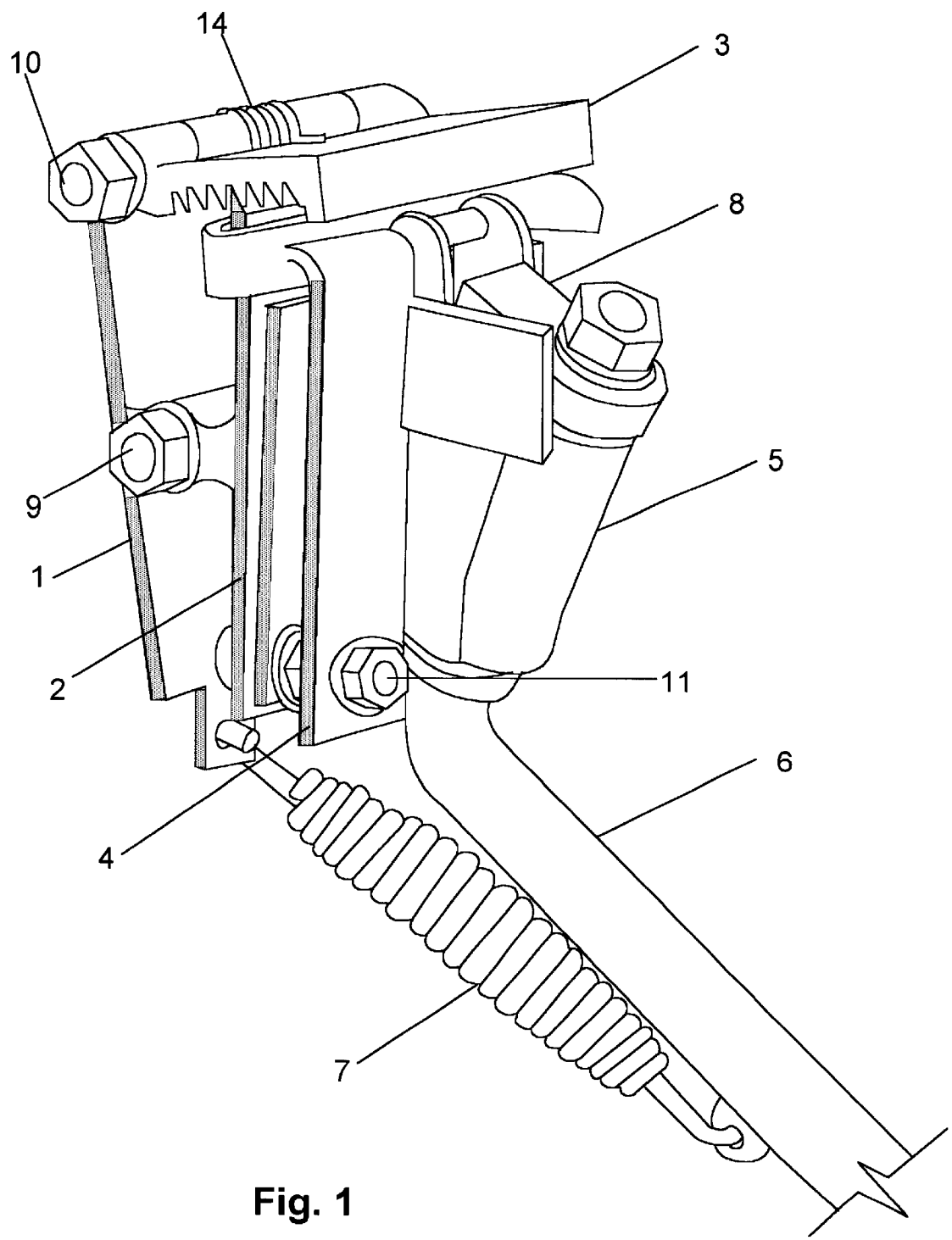
FIG. 1 is a three-dimensional view of the invention as assembled on the motorcycle with the kickstand and main spring attached.

Following is a list of the referenced numerals in the drawings:

| Number | Description |
| --- | --- |
| 1 | Frame Plate |
| 2 | Backing Plate |
| 3 | Ratchet Arm |
| 4 | Lifting Arm |
| 5 | Kickstand Frame |
| 6 | Kickstand |
| 7 | Main Spring |
| 8 | Lock Lug |
| 9 | Main Pivot Shaft |
| 10 | Ratchet Plate Pivot Shaft |
| 11 | Lifting Arm Pivot Shaft |
| 12 | Mounting Bolts |
| 13 | Motorcycle Frame |
| 14 | Ratchet Plate Spring |
| 15 | Backing Plate Spring |
| 16 | Ratchet Plate Shaft Guide |
| 17 | Frame Plate Bevel |
| 18 | Mounting Hole |
| 19 | Main Shaft Guide |
| 20 | Frame Plate Spacer |
| 21 | Frame Plate Base-plate |
| 22 | Backing Plate Base-plate |
| 23 | Backing Plate Bevel |
| 24 | Mounting Hole |
| 25 | Main Shaft Guide |
| 26 | Backing Plate Spacer |
| 27 | Ratchet Plate Shaft Guide |
| 28 | Ratchet Grooves |
| 29 | Ratchet Plate Bevel |
| 30 | Lever Arm |
| 31 | Lock Lug Receiver |
| 32 | Fulcrum Hole |
| 33 | Fulcrum Arm |

SUMMARY OF THE INVENTION

To achieve the foregoing and other advantages, the present invention provides a two-wheeled vehicle with a device which automatically adjusts the height of a kickstand's point of contact with the ground to compensate for uneven ground surfaces. The device therefore insures that the two wheeled vehicle will be reasonably stable when parked, by virtue of the fact that it will always be parked at the optimum lean angle, regardless of the contour of the ground surface.

DESCRIPTION—FIGS. 1–13

Figure 2:
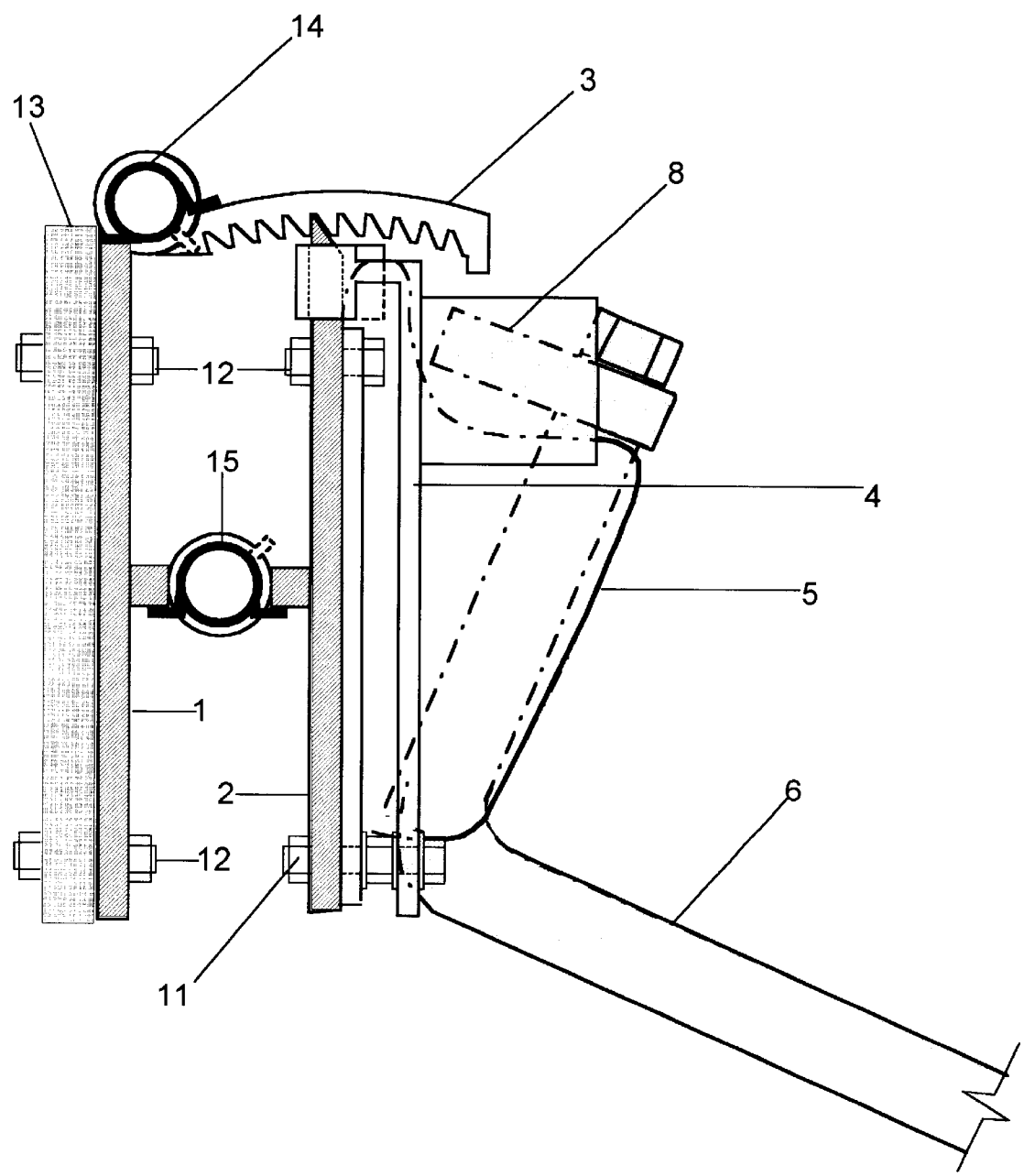
FIG. 2 is a side view of the invention shown in FIG. 1. This view shows how the invention is attached to the frame of the motorcycle and kickstand, and also shows the positions of the springs that control the operation of the ratchet plate and backing plate.

The typical embodiment of the invention is illustrated in FIGS. 1 and 2. FIGS. 3 through 13 show each of the unassembled pieces that comprise the invention along with their functional components. FIG. 1 shows the invention as it would be attached to the a kickstand frame 5, which holds the kickstand 6. The kickstand frame 5 and kickstand 6 shown on FIGS. 1 and 2, are depictions of typical stock components currently found on many large motorcycles.

The kickstand 6 includes a lock lug 8 which performs two functions in the stock configuration; first, it abuts the kickstand frame 5 so as to prevent the kickstand from swinging more than approximately 90 degrees when swung open, and second, it slides into the kickstand frame 5 to allow the motorcycle to be leaned over for parking and locks the kickstand 6 in position so it will not swing forward or backward until the motorcycle is again raised into the upright position.

The main spring in FIG. 1 is also a depiction of a stock spring which is attached to the kickstand 6 and an appendage on the frame plate 1. The appendage is positioned such that the main spring 7 is always in an extended state, and the force exerted by the main spring 7 holds the kickstand 6 at the maximum travel position when it is closed or open. The main spring 7 also exerts a downward force on the kickstand when swung into the open position.

Finally, FIG. 1 shows how the ratchet plate pivot shaft 10 provides the pivot point between the ratchet plate 3 and the frame plate 1. It further shows the main pivot shaft 9 which performs the same function between the frame plate 1 and the backing plate 2. It also shows the lifting arm pivot shaft 11, which performs two functions; first it provides the pivot point for the lifting arm 4 and secondly, it is used a mounting bolt between the kickstand frame 5 and the backing plate 2.

FIG. 2 shows a side view of the invention in FIG. 1 attached to the motorcycle frame 13. It also shows how the mounting bolts 12 and lifting arm pivot shaft 11 are employed to mount the invention between the motorcycle frame 13 and the kickstand frame 5. The figure also shows the positions of the ratchet plate spring 14 and the backing plate spring 15. The ratchet plate spring exerts a clockwise torsional force on the ratchet plate 3, and the backing plate spring 15 exerts a counter clockwise torsional force on the backing plate 2.

FIGS. 3, 4, and 5 show a front, side and top view of a typical embodiment of the frame plate 1. The ratchet plate pivot shaft 10 fits through the ratchet plate shaft guides 16, and the main pivot shaft 9 fits through the main shaft guides 19. The ratchet plate spring 14 and backing plate spring 15 are positioned directly on the two pivot shafts between these guides. The frame plate spacer 20 is designed to allow the backing plate 2 sufficient angular movement to raise and lower the kickstand's 6 point of contact with the ground within a desired range. The frame plate bevel (FIG. 3A) 17 is required to allow room for the ratchet plate shaft guides 27 and the ratchet plate spring 14. The mounting holes 18 are for mounting the invention onto the motorcycle. These holes can be drilled in any pattern appropriate for the application.

FIGS. 6, 7, and 8 show a front, side and top view of a typical embodiment of the backing plate 2. The main pivot shaft 9 fits through the main shaft guides 25. The backing plate spacer 26 is designed to allow the backing plate 2 sufficient angular movement to raise and lower the kickstand's 6 point of contact with the ground within a desired range. The backing plate bevel (FIG. 7A) 23 is designed to fit into the ratchet groves 28 on the ratchet plate 3. The mounting holes 23 are for mounting the kickstand frame 5 onto the invention. These holes can be drilled in any pattern appropriate for the application.

FIGS. 9 and 10 show the top and side view of the ratchet plate 3. The plate is mounted on the ratchet plate pivot shaft 10 by inserting it through the ratchet plate shaft guides 27. The ratchet grooves are cut in a fashion that allows the backing plate 2 to travel in one direction only when the backing pate 2 and ratchet plate 3 are engaged. This can be accomplished by cutting the face on the ratchet grooves closest to ratchet plate shaft guides 27 at an angle approximately on line to center of the main pivot shaft, and the opposite face at a larger angle appropriate for a ratchet action. As an example, the opposite face shown on FIG. 10 is between 30 and 45 degrees. The ratchet effect can also be accomplished through other existing ratchet designs. The ratchet plate bevel (FIG. 9A) 29 is designed to allow sufficient room for the frame plate's I ratchet plate shaft guides 16 and the ratchet plate spring 14.

FIGS. 11, 12 and 13 show the front side and top views of the lifting arm 4. This component is designed to lift the ratchet plate 3, thus disengaging it from the backing plate 2 when the kickstand 6 is swung back into a closed position. It performs this function when the lock lug 8 rotates the fulcrum arm 33 on the lifting arm pivot shaft 11, which is placed through the fulcrum hole 32. The above said rotation causes the end of the lever arm 30 to raise ratchet plate 3 and thereby disengages the backing plate 2. The lever arm 30 is designed to wrap around and slide on the backing plate 2. When the kickstand 6 is swung out into an open position, the ratchet plate spring 14 applies sufficient downward force to rotate the lifting arm 4 back into its lowered position, thus allowing the ratchet plate 3 and backing plate 2 to engage.

OPERATION—FIGS. 1, 2, AND 13

As shown on FIGS. 1 and 2, the kickstand frame 5, which houses the kickstand 6, is mounted on the backing plate 2. The main spring 7 is attached to the kickstand 6 and the frame plate 1. The ratchet plate 3 is attached to the frame plate 1 by the ratchet plate pivot shaft 10. The ratchet plate spring 14 applies a constant force on the ratchet plate 3 sufficient to keep the backing plate bevel 23 fully engaged in the ratchet grooves 28. The frame plate 1 is mounted to the motorcycle frame 13 by mounting bolts 12 which are inserted through mounting holes 18, drilled to conform to the original mounting bracket on the motorcycle. The mounting holes 24 on the backing plate 2 may be drilled to the same pattern to accommodate mounting a stock kickstand frame 5. The operation of the device is straight forward. When the kickstand 6 is swung backward into its resting position under the motorcycle, the lock lug 8 engages the lock lug receiver 31, causing the lifting arm 4 to rotate on the lifting arm pivot shaft 11, raising the lever arm 30, which lifts the ratchet plate 3. This action causes the ratchet plate 3 to disengage from the backing plate 2. When the ratchet plate 3 and backing plate 2 are disengaged, the backing plate spring 15 causes the backing plate 2 to rotate counterclockwise (FIG. 2) into a resting position.

When the kickstand 6 is in the resting position under the motorcycle, the device therefore has set the kickstand 6 at its maximum distance (at its highest elevation) from the ground surface.

When the kickstand 6 is swung out, the forces acting upon it cause the point of contact to remain at its highest level until it is nearly at the end of its outward arc, and then to ratchet down until it reaches the ground. Several mechanisms cause this action to occur. First, about two-thirds way through the approximately 90 degree arc that the kickstand is swung out on, the lock lug 8 disengages from the lock lug receiver 31 and, under the torsional force of the ratchet plate spring 14, the ratchet plate 3 engages the backing plate 2. Secondly, the constantly increasing downward force provided by the main spring 7 causes the point of contact to lower and find the level of the ground.

When the kickstand 6 is stored under the frame for riding, the main spring 7 is parallel to the motorcycle frame 13, the frame plate 1 and the backing plate 2. In this position, it exerts a lateral force which keeps the kickstand 6 locked in the resting position and, it exerts no downward force, counter torsional force produced by the backing plate spring 15 (FIG. 2.) The backing plate spring 15, therefore holds the kickstand 6 at its highest position.

When the kickstand 6 is swung out, the main spring 7, which is attached to it also swings out approximately 90 degrees and, in so doing, exerts a downward force on the kickstand 6 counter to, and greater than, the torsional force exerted by the backing plate spring 15. The force exerted by the main spring 7 "takes over" and causes the kickstand to ratchet down its point of contact to the level of the ground. Once the kickstand has found the level of the ground, the motorcycle can be leaned over and it will be at, or very near to the optimal angle of lean.

As mentioned above, the device works in reverse when the kickstand 6 is raised to its resting position in preparation for riding. The main spring 7, as it is swung back approximately 90 degrees, ceases to exert a clockwise torsional force on the backing plate 2, allowing the force of the backing plate spring 15 to "take over." At the same time, the lock lug 8 engages the lock lug receiver 31, causing the lifting arm 4 to raise the ratchet plate 3 and disengaging the backing plate 2. The force exerted by the backing plate spring 15 brings the kickstand 6 back into its raised position, again ready for deployment.

CONCLUSIONS, RAMIFICATIONS AND SCOPE

As shown above, the invention can be used to automatically adjust a kickstand's point of contact with the ground to compensate for uneven ground surfaces. The device therefore maintains the two wheeled vehicle at the optimum lean angle for maximum stability while parked. The devise is designed for easy installation between the motorcycle and existing kickstand, generally requiring no more than removal of the existing kickstand and installing the device on the existing bracket and reinstalling the kickstand assembly. The device requires no additional effort than the stock configuration to employ. The design of the device is simple, with only a few moving parts. Its components are all accessible without the need to remove or disassemble the device to clean or lubricate it. The device is designed such that its potential impact on the aesthetic appearance of motorcycle is minimal. The device can be fitted to numerous models by simply conforming the hole pattern to the particular model.

The above brief description sets forth rather broadly the more important features of the present invention so that the detailed descriptions may be better understood, and the contributions to the art may be better appreciated. There may be additional features of the invention that will be documented hereafter and for the subject matter of the claims appended hereto. In this respect, the intension is not to limit the invention in its application to the details of the construction and to the arrangements of the components set forth in the above description or illustrated in the drawings. The invention is capable of other embodiments and of being practiced and carried out in various ways. Also, the phraseology and terminology employed herein are for the purpose of description and should not be regarded as limiting. As such, the intent is that those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

Finally, the purpose of the Abstract provided at the end of this specification is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed is:

1. A height adjusting device that is interposed between a motorcycle and the motorcycle's kickstand that adjusts the height of the kickstand's point of contact with the ground, comprising:
    (a) a frame plate, a backing plate, a ratchet plate and a lifting arm member which adjusts the height of the kickstand's point of contact with the ground when the kickstand is swung into the open position and disengages allowing the kickstand to raise back into a storage position when the kickstand is swung into the closed position, and
    (b) springs which are placed on the devise and configured to control the operation of the devise when the kickstand is raised and lowered.

2. The device of claim 1 which further comprises a kickstand assembly.

3. A height adjusting device for a motorcycle kickstand which is connected to the frame of the motorcycle, comprising:
    (a) a stationary frame plate which connects the device to the motorcycle and is connected to a ratchet plate by means of a pivotal connection at the upper end and is also connected to a backing plate by means of a pivotal connection at its approximate center, and
    (b) a backing plate which:
        1. is connected to the frame plate of 4 (*a*) by means of a pivotal connection at its approximate center, and
        2. is connected to a kickstand device, and
        3. has a beveled surface at its upper end which interfaces with a ratchet plate, and
    (c) a ratchet plate which is connected to the frame plate of 4 (*a*) above by means of a pivotal connection and has groves cut on one side such that they interface with the beveled surface of the backing plate of 4 (*b*) above, and
    (d) a lifting arm member which is attached to the backing plate of 4 (*b*) above by means of a pivot shaft, which member when acted upon rotates the lifting arm, disengaging the ratchet plate of 4 (*c*) above from the backing plate of 4 (*b*) above when the kickstand is swung to its closed position, and
    (e) springs positioned such that the ratchet plate of 4 (*c*) above and backing plate of 4 (*b*) above automatically engage, disengage, and act as a ratchet device to adjust the height of the kickstand's point of contact with the ground surface when the kickstand is swung to the open or closed position.

4. The device of claim 3, which further comprises of a kickstand assembly.

* * * * *